US006471580B2

(12) United States Patent
Ro

(10) Patent No.: US 6,471,580 B2
(45) Date of Patent: Oct. 29, 2002

(54) ACTUATOR FOR CAR AIR DUCT DAMPER

(75) Inventor: Hyuk Joon Ro, Kyunggi-do (KR)

(73) Assignee: Pro Quip International Korea Co., Ltd., Kyunggi-do (KR)

(*) Notice: Subject to any disclaimer, the term of this patent is extended or adjusted under 35 U.S.C. 154(b) by 0 days.

(21) Appl. No.: 09/983,848

(22) Filed: Oct. 26, 2001

(65) Prior Publication Data

US 2002/0068520 A1 Jun. 6, 2002

(30) Foreign Application Priority Data

Dec. 2, 2000 (KR) .................................... 2000-0072683

(51) Int. Cl.[7] .................................................. B60H 1/00

(52) U.S. Cl. ..................... 454/69; 251/129.11; 454/156

(58) Field of Search .............. 454/69, 156; 251/129.05, 251/129.11

(56) References Cited

U.S. PATENT DOCUMENTS

RE29,495 E * 12/1977 Georgi .......................... 222/1

4,406,396 A * 9/1983 Habegger ................... 126/293

5,351,405 A * 10/1994 Beebe ......................... 33/203

5,623,715 A * 4/1997 Clark ......................... 222/309

* cited by examiner

*Primary Examiner*—Harold Joyce

(74) *Attorney, Agent, or Firm*—Bacon & Thomas, PLLC

(57) ABSTRACT

An actuator for car air duct damper which allows a precise control on the flow of the air. The actuator invention includes a rotary wheel (30) provided on and coaxial to the rotation shaft (54) of the damper (53), said rotary wheel being formed with a plurality of holes (33) along its circumference at a predetermined interval, optical sensors (40) disposed at the both side of the rotary wheel (30) closely so as to correspond to the holes (33), said optical sensors detecting the passage of the light through the holes (33), and a control section connected respectively to the optical sensors (40 ) and input button (63) in the indoor space of a car for controlling the driving motor (10) in accordance with respective input signals.

4 Claims, 7 Drawing Sheets

26
30
23
40
33
54
20
21
10
53

ACTUATOR FOR CAR AIR DUCT DAMPER

FIELD OF THE INVENTION

The present invention relates to an actuator for air duct damper in a car, and more particular to an actuator for air duct damper in a car with a new structure which allows a precise control on the flow of the air supplied in the indoor space of a car and which is improved in durability.

BACKGROUND OF THE INVENTION

Generally in a car, air ducts 52 connected to a number of ejecting openings 51 in communication with the interior of a car are provided to supply into the indoor space of a car either the air heated or cooled by a heater 57 or an air conditioner evaporator 55 or the fresh outside air, as shown in FIG. 1. Further, the air ducts 52 are provided with a number of dampers 53 to control the flow of the air supplied to the respective ejecting openings 51, wherein the dampers 53 are adjusted in their degree of opening by respective actuators feed-back controlled.

A conventional actuator for adjusting the opening of an air duct damper comprises, as shown in FIG. 2, a driving motor 10 brought into rotation by a control section, a power transmitting mechanism 20 provided in a case 65 and connected to the driving motor 10 for transmitting a torque of the motor 10 to a damper 53, a connection terminal 61 provided at the power transmitting mechanism 20 and brought into rotation together with the power transmitting mechanism 20, a printed circuit board 60 attached on the case 65 and on which the connection terminal 61 is rotatable contacted. Further, as shown in Figure 3, a printed variable resistance band 63 is provided at the bottom of the printed circuit board 60 and connected to different circuit pattern in accordance with the change of the contact position of the connection terminal 61.

Therefore, when a passenger causes the transmission of a signal to the control section by operating an inputting section 63 installed on an instrument panel, the above-described driving motor 10 is brought into rotation in accordance with the signal of the control section, opening the damper 53 connected to the driving motor 10 through the power transmitting mechanism at a predetermined rotation angle. And, the connection terminal 61 is disposed on one side of the power transmitting mechanism 20 so as to be rotated together with the power transmitting mechanism 20, and the connection terminal 61 is rotated in contact with the variable resistance band 63, so that the feed back signal about the rotation angle of the damper 53 can be transmitted to the control section.

However, there is a problem with such an actuator in that the opening of a damper 53 is difficult to exactly control, when the resistance value becomes erroneous due to the deposition of a foreign material on the variable resistance band 63 or the connection terminal 61, the change in the temperature or the like, because the rotation angle indicating the duct opening is sensed as the variation in the resistance depending on the contacting location between the connection terminal 61 and the variable resistance band 63. There is another problem of the decreased durability of the commodities, because easy wear takes place with the repeated operation as the result of the tight contact operation between the connection terminal 61 and the variable resistance band 63.

Moreover, there is still other disadvantage of the need for a separate interface circuitry, because the analog resistance signal representing the opening of a damper, as sensed, needs to be converted to a corresponding digital signal in order to be used for the feed back control of the driving motor.

SUMMARY OF THE INVENTION

The present invention is intended to resolve the problem as described above and so the object of the invention is to provide an actuator for air duct damper in a car with a new structure, which allows a precise control on the flow of the air supplied in the indoor space of a car and which is improved in durability.

The above object is achieved according to the first feature of the invention by an actuator for car air duct damper including a driving motor 10 and a power transmitting mechanism 20 for transmitting the torque of the driving motor 10, said power transmitting mechanism 20 being provided at its final stage with a damper 53 for opening and closing air duct 52, wherein said actuator further comprises a rotary wheel 30 provided on and coaxial to the rotation shaft 54 of the damper 53, said rotary wheel being formed with a plurality of holes 33 along its circumference at a predetermined interval, optical sensors 40 disposed at the both side of the rotary wheel 30 closely so as to correspond to the holes 33, said optical sensors detecting the passage of the light through the holes 23, and a control section connected respectively to the optical sensors 40 and input button 63 in the indoor space of a car for controlling the driving motor 10 in accordance with respective input signals.

The above object is also achieved according to the second feature of the invention by an actuator for car air duct damper, wherein said power transmitting wheel 30 comprises either the final gear 25 of the power transmitting mechanism 20 directly formed with a plurality of holes 33 or a wheel formed with a plurality of holes 33, said wheel being provided separately from the final gear 25.

The above object is also achieved according to the third feature of the invention by an actuator for car air duct damper, wherein two or more concentric rows of holes 33*a,* 33*b* are formed in the circumferential area of said rotary wheel 30 in such a manner that the holes in an row are offset with regard to those in the neighboring row by a predetermined circumferential angle, and separate optical sensors 40*a,* 40*b* are disposed in locations corresponding to respective rows of holes 3*a*, 33*b,* so that the detection of rotating angle of the rotary wheel 30 can be made the more precisely with the increase in the rows of holes 33*a*, 33*b*.

The above object is also achieved according to the forth feature of the invention by an actuator for car air duct damper, wherein a plurality of holes 33 are disposed on the whole 360° periphery of the rotary wheel 30 by the predetermined interval, therefore the rotation angle can be sensed by said rotary wheel 30 and optical sensor 40 although said damper 53 is rotated as much as 360° or more.

DETAILED DESCRIPTION OF THE INVENTION

Preferred embodiments of the invention will be described in detail below by referring to the accompanying drawings.

Figure 1:
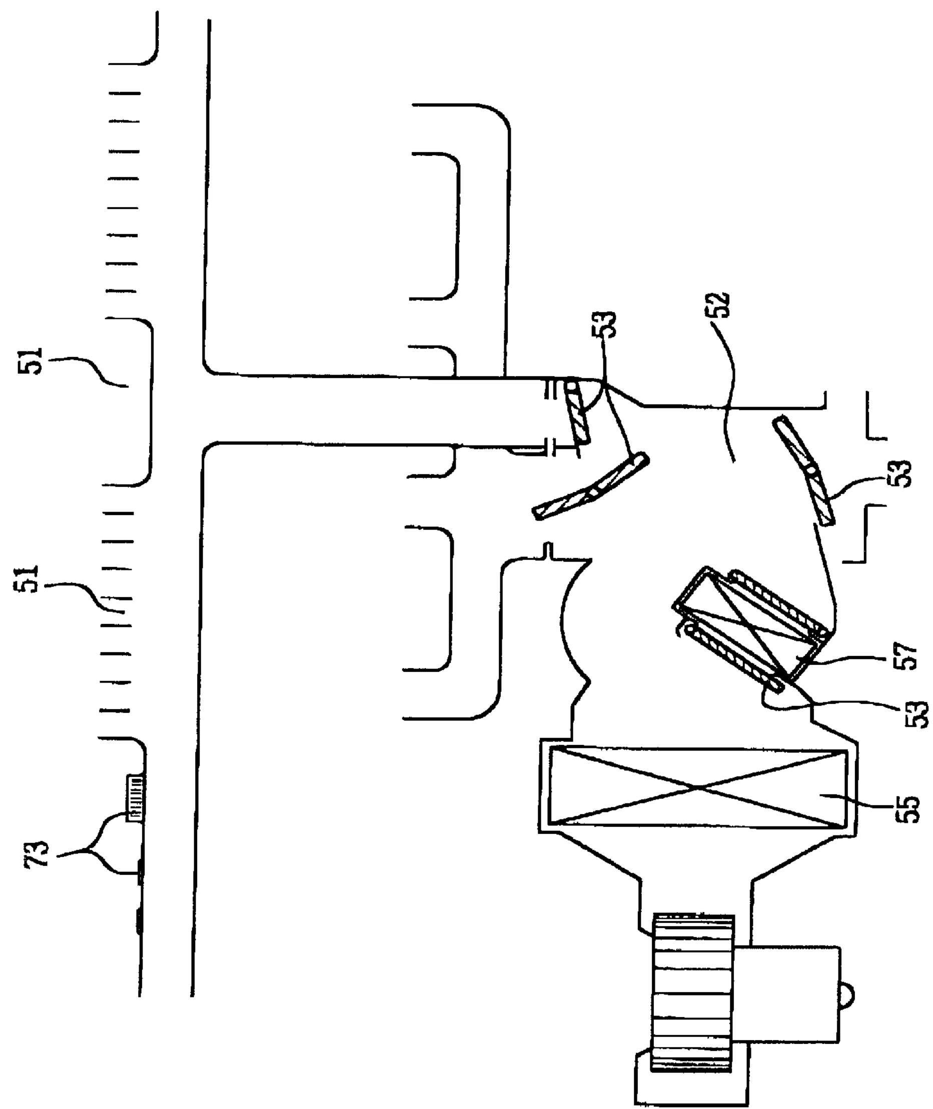
FIG. 1 shows the schematic arrangement of air ducts in a car.
Figure 2:
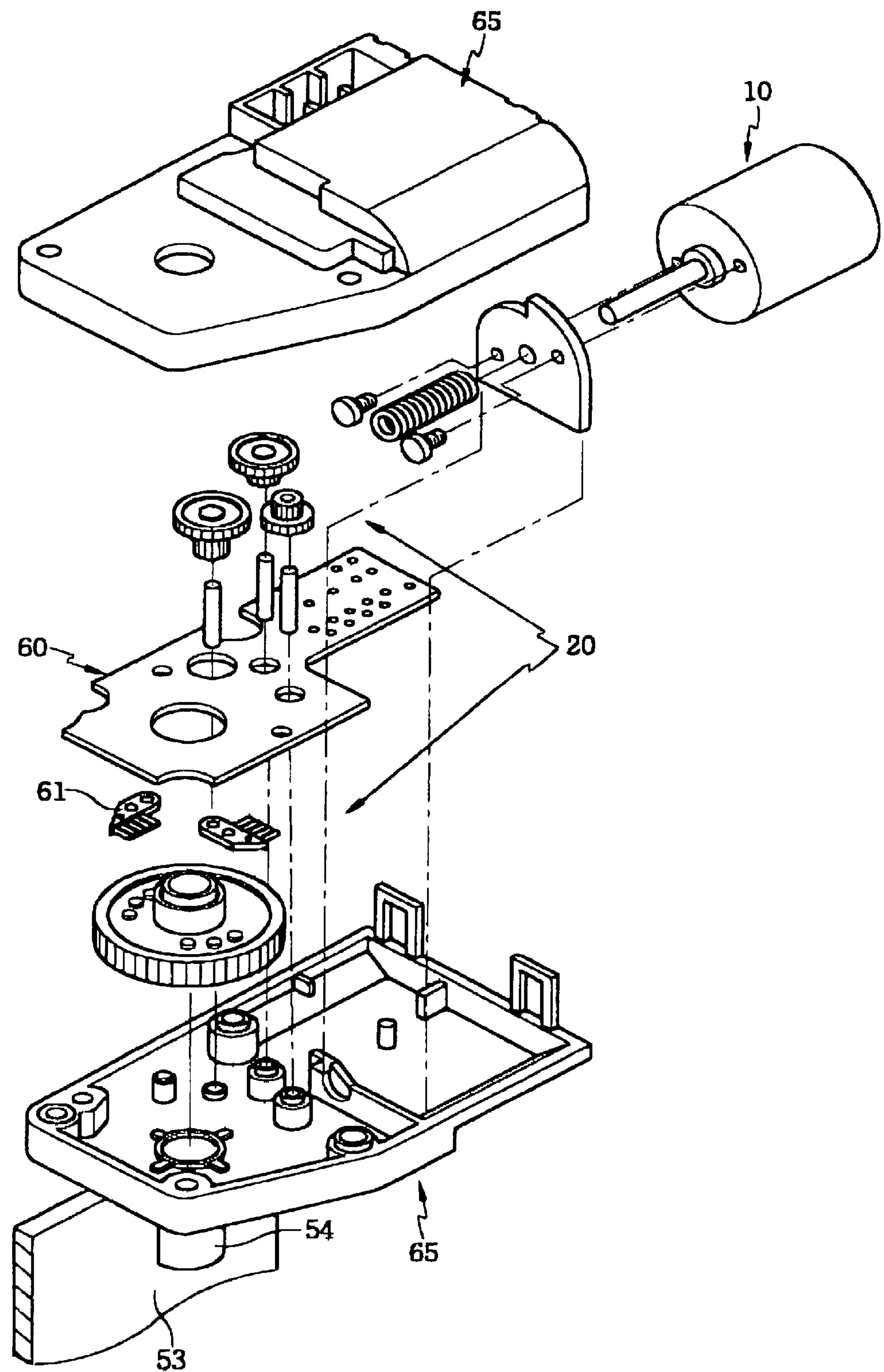
FIG. 2 shows the perspective exploded view of a conventional air duct damper actuator.
Figure 3:
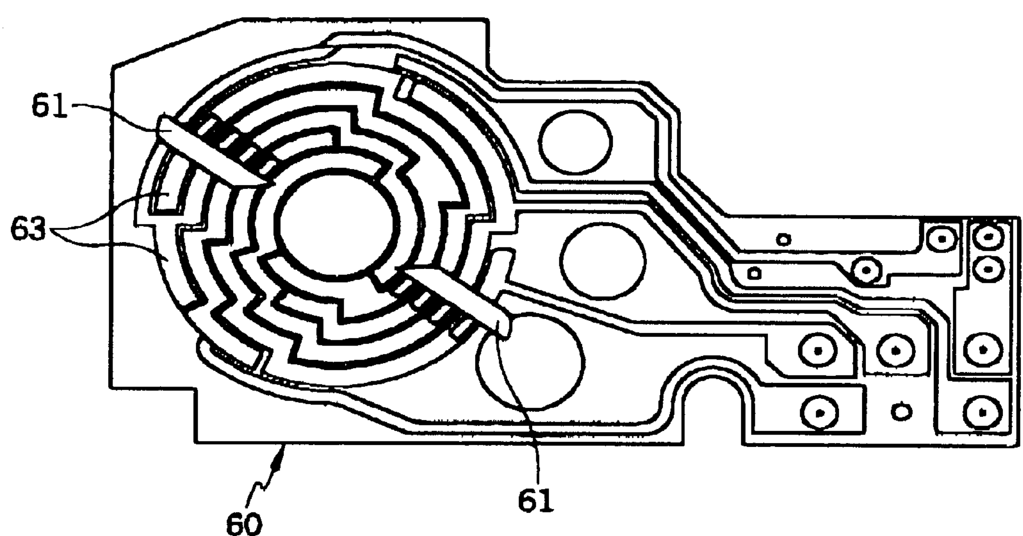
FIG. 3 shows a bottom view of a printed circuit board of a conventional air duct damper actuator.

Referring to FIG. 4 to FIG. 7, which shows the perspective views of an actuator according to embodiments of the invention. There are provided with a power transmitting mechanism 20 for transmitting the torque of the driving motor 10 to a damper 53, the input button 67 of FIG. 1 installed on the instrument panel, and the control section for controlling the driving motor 10 in accordance with the signal from the input button 67. And there are also provided with a rotary wheel 30 disposed on and coaxial to the hinge of damper 53, and having a plurality of holes 33 along its circumference at a predetermined interval, and optical sensor 40 which is disposed at the both side of the rotary wheel 30 and detects the rotation angle of the rotary wheel 30, wherein the rotation angle of said damper 40 is sensed by the optical sensor 40 more precisely.

The driving motor 10 which is connected to the damper 53 for air duct through a power transmitting mechanism 20 to regulate the opening of the duct is also connected to the control section in the car, so that the rotating direction and rotated angel of the rotary wheel can be externally controlled. The power transmitting mechanism 20 comprises a driving gear 21 provided on the rotation shaft of the driving motor 10, a worm gear 23 engaged with the driving gear 21 for transmitting the torque at a reduced speed, and a driven gear 25 rotatable in engagement with the worn gear 23, at one end of which driven gear the damper 53 is mounted and at the other end of which driven gear the rotary wheel 30 is fixed. It is to be noted that as the power transmitting mechanisms 20, any other types of gears, belts or the like which are capable of precisely transmitting the torque of the driving motor 10 to a damper at a reduced speed may be used.

Furthermore, the rotating shaft 26 of the driven gear 25 of a power transmitting mechanism 20 is provided rotatably to the body of a car or in the shaft bearing 27 in the form of boss formed in a separate case, wherein in the front end of the shaft 27, an oiling groove 28 is formed, so that it can serve to reduce the frictional force during rotation by supplying the oil stored in the oiling groove to the power transmitting mechanism 20.

Figure 4:
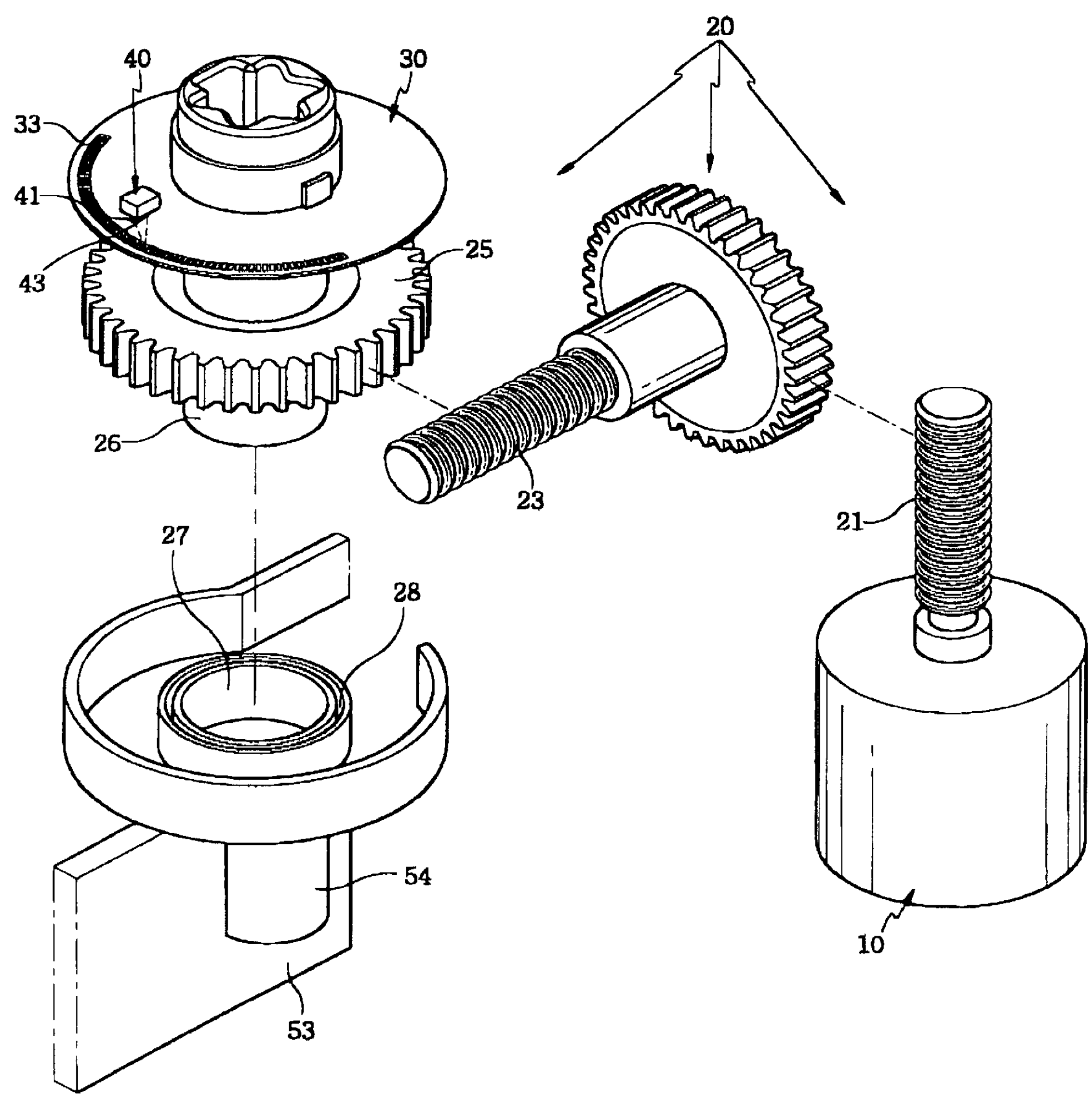
FIG. 4 shows the perspective exploded view of air duct damper actuator according to the first embodiment of the invention.
Figure 5:
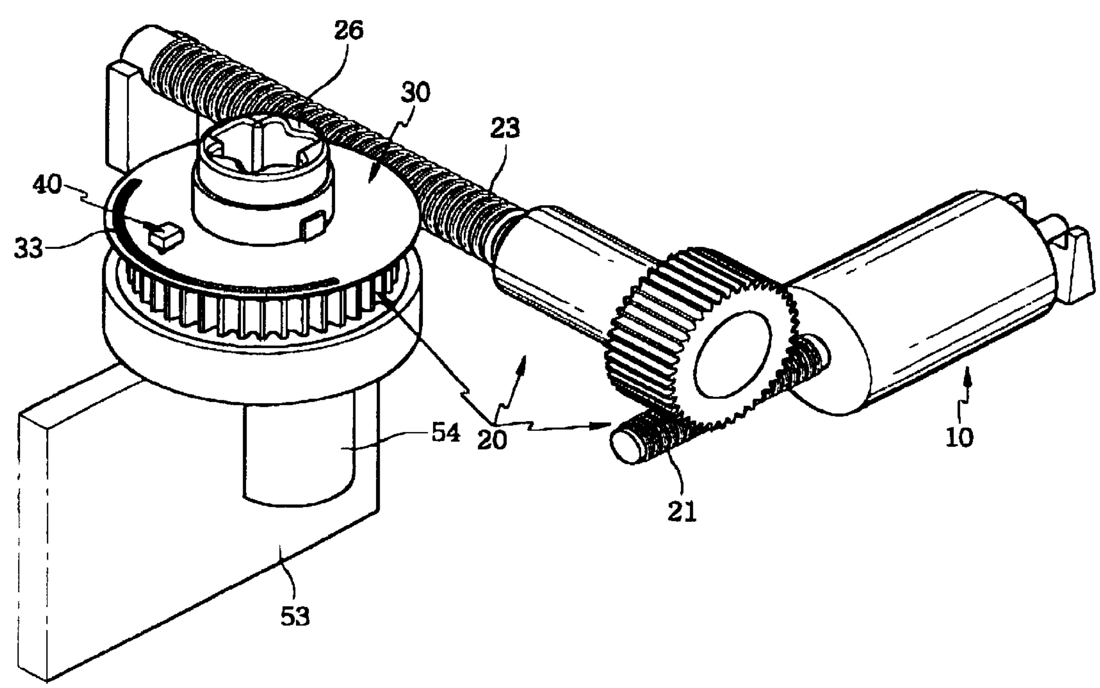
FIG. 5 shows the perspective view of the embodiment of FIG. 4.
Figure 6:
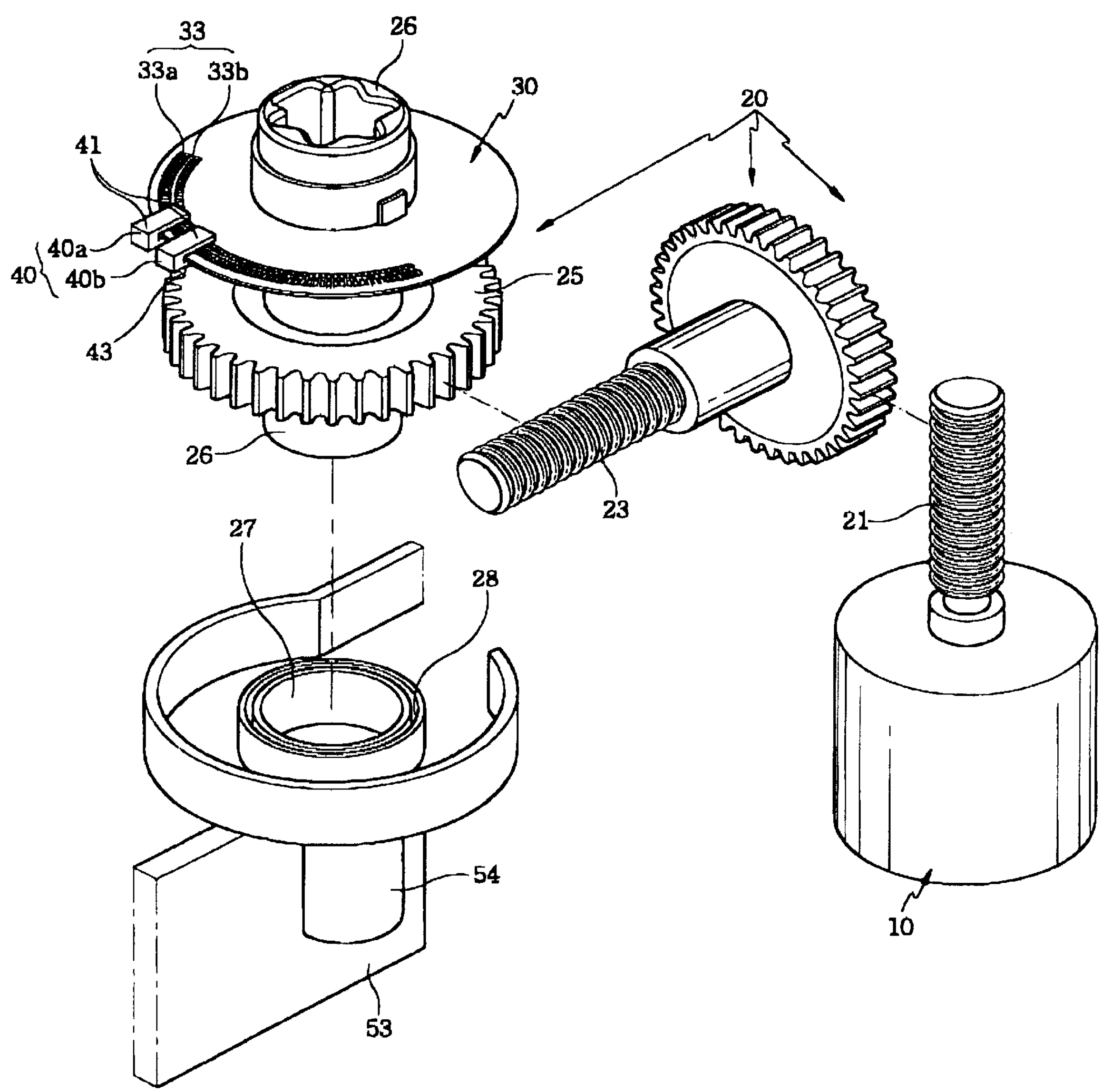
FIG. 6 shows the perspective exploded view of air duct damper actuator according to the second embodiment of the invention.
Figure 7:
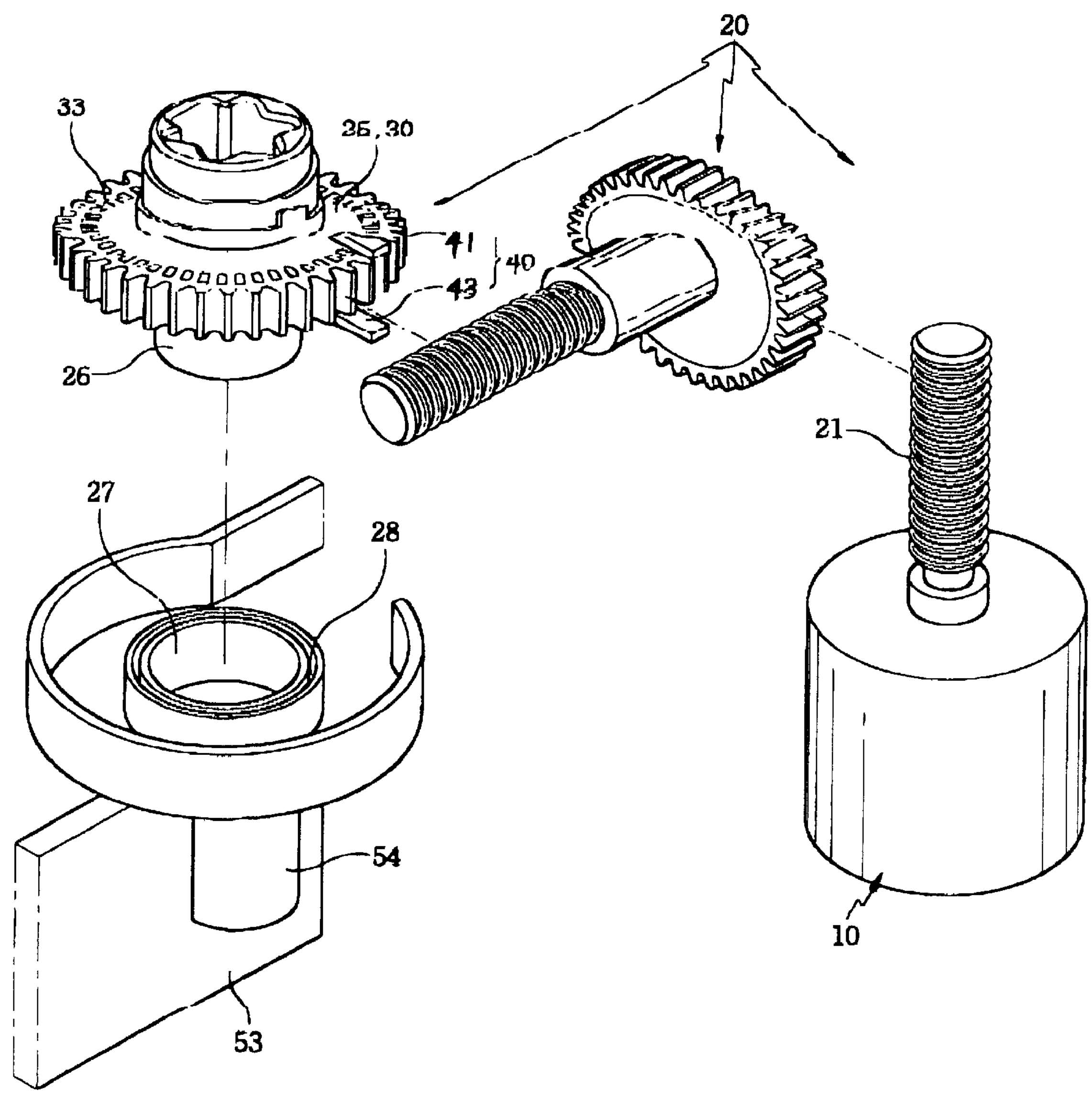
FIG. 7 shows the perspective exploded view of air duct damper actuator according to the third embodiment of the invention.

As this rotary wheel 30, the final driven gear 25 of a power transmitting mechanism 20 may be used by forming a number of holes 33 on the periphery as shown in FIG. 7. But a discrete wheel having a number of holes 33 may be preferably used as shown in FIG. 4 to FIG. 6. The holes 33, as shown in FIG. 4, FIG. 5 and FIG. 7, can be formed in one row but, if said holes 33 are formed in two rows, more precise detection on the rotation angle of the damper 53 can be achieved. Then, the respective holes 33*a* or 33*b* in one row are positioned midway between the holes 33*b* or 33*a* in the other row. Further, the holes 33 may be formed only at partial section of the rotary wheel 30, but if said holes 33 are formed at the whole circumferential section, as shown in FIG. 7, the rotation of damper 53 for as much as 360° or more can be detected by the rotor wheel 30 and the optical sensor 40. That is, the rotation of damper 53 can be sensed although the damper 53 may be rotated many times.

The optical sensor 40 is disposed at positions corresponding to the rows of holes 33, as shown in FIG. 6 and FIG. 7. It consists of an emitting part 41 and a receiving part 43 provided on the opposite sides of holes 33 of the rotary wheel 30, so that those parts may detect the light passed through the holes 33 or, as shown in FIG. 4 and FIG. 5, detect the light reflected by the wall surfaces between the holes 33. The optical sensor 40 converts the optical signal incident to the receiving part 43 into digital electric signal to be transmitted to the control section, so that the control section can detect the rotated angle and speed of the rotary wheel 30 to thereby perform feed-back control of the driving motor 10.

In operation of the actuator for car air duct damper constructed as described above, when a passenger inputs signal into the control section through the manipulation of the input buttons 73, the signals from the control section cause the driving motors 10 to operate, so that the flow of the air supplied into the indoor space of a car may be adjusted through opening or closing of the dampers 53 installed in air ducts 52 to a finite degree. Then, the rotated angles of the rotary wheels 30 equipped on the final stages of power transmitting mechanisms 20 are detected as digital signals by optical sensors 40 to be transmitted to the control section for feed-back control of driving motors 10.

Accordingly, the durability of the commodities can be improved due to the no wear of sensors even after a long time service, because the operation of the actuator is based on the optical signals incident on light receiving parts 43, with the optical sensors 40 maintained out of contact with the rotary wheels 30. The conventional tedious signal processing procedure to convert analog signals into digital signals to be transmitted to the control section, the corresponding conversion circuits and the like can be dispensed with, because the rotary wheels detect the rotated angles in digital signals before transmission to the control section, with the result that the construction becomes simpler and the cost of the commodities can be decreased.

Further, as the actuators detect the rotated angles of dampers 53 according to the optical signals incident on light receiving parts 43, they are less influenced by the environments like foreign materials or temperature fluctuations than the conventional devices, and can realize precise control even through the detection of the rotating speed by means of digital optical signals.

Moreover, as the actuators are mounted concentrically with the final stages of power transmitting mechanisms 20, i.e. with dampers 53 and so caused to rotate together with them, exact opening of those dampers 53 at desired angle is possible, because the dampers 53 and the rotary wheels 30 are rotated integrally for feed-back control, even when back lashes or the like have happened in the course of transmitting the torque through power transmitting mechanisms 20.

Furthermore, if plural rows of holes 33*a*, 33*b* are formed in the circumferential section area of the rotary wheel 30, and separate optical sensors 40*a*, 40*b* are disposed in respective holes 33*a*, 330*b* corresponding respective rows, more precise detection for the opening dangle of the damper 53 can be achieved. For instance, assuming that holes 33 in each row are spaced 1° apart, the feed-back control through detection of two rows of holes 33*a* and 33*b* by using a pair of optical sensors 40*a* and 40*b* will provide the precision in the unit of 0.5° for the rotated angle of the rotary wheel 30, while the feed-back control through detection of one row of holes 33 by using a single sensor 40 will provide only the precision in the unit of 1°, whereby the control with doubled precision is realized for the case of two rows.

Further, for the above described actuator according to the invention, even though any one optical sensor 40*a*, 4*b* gets in trouble during the use for a long period, a certain other optical sensor or sensors 40*a*,40*b* can conduct feed-back control of the driving motor, whereby the reliability of the operation or commodities is insured.

As described above, the actuator according to the invention has the advantages that damage by wear can be eliminated due to the optical sensors installed out of contact with the rotary wheel, additional signal processing processes and conversion circuits are not necessary because of digitally detected optical signals for the rotation angle of the rotary wheel, and a precise detection and control as well as the increased reliability and durability are insured through the formation of plural rows of holes in the rotary wheel.

What is claimed is:

1. An actuator for a car air duct damper including a driving motor and a power transmitting mechanism for transmitting the torque of a driving motor, said power transmitting mechanism being provided at its final stage with a damper for opening and closing an air duct wherein, said actuator further comprises a rotary wheel provided on and coaxial to a rotation shaft of the damper, said rotary wheel being formed with a plurality of holes along its circumference at a predetermined interval; optical sensors disposed at the both sides of the rotary wheel closely so as to correspond to the holes, said optical sensors detecting the passage of the light through the holes; and a control section connected respectively to the optical sensors and an input button in the indoor space of a car for controlling the driving motor in accordance with respective input signals.

2. The actuator for a car air duct damper of claim 1, wherein said power transmitting wheel comprises either the final gear of the power transmitting mechanism directly formed with a plurality of holes or a wheel formed with a plurality of holes, said wheel being provided separately from the final gear.

3. The actuator for a car air duct damper of claim 1 or 2, wherein two or more concentric rows of holes are formed in the circumferential area of said rotary wheel in such a manner that the holes in an row are offset with regard to those in the neighboring row by a predetermined circumferential angle, and separate optical sensors are disposed in locations corresponding to respective rows of said holes, so that the detection of rotating angle of the rotary wheel can be made the more precisely with the increase in the rows of holes.

4. The actuator for a car air duct damper of claim 1 or 2, wherein a plurality of holes are disposed about the whole 360° periphery of the rotary wheel by the predetermined angle, so that the rotation angle can be sensed by said rotary wheel and optical sensor when said damper is rotated as much as 360° or more.

* * * * *